Jan. 10, 1956  O. W. ROE  2,730,341
AIR COOLING SYSTEM
Filed June 16, 1953  3 Sheets-Sheet 1
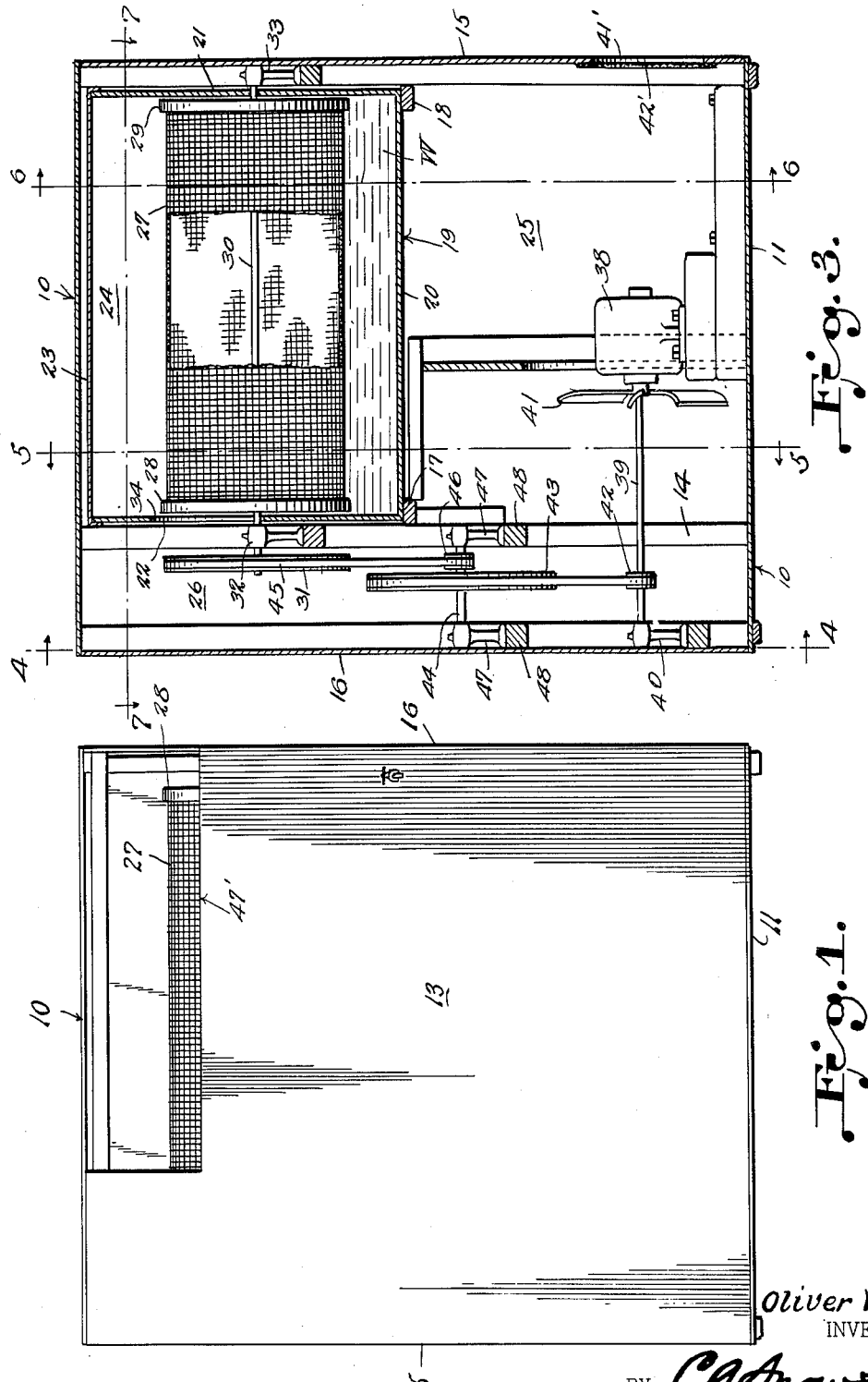
Oliver W. Roe
INVENTOR
BY *Clanow &Co.*
ATTORNEYS.

Jan. 10, 1956  O. W. ROE  2,730,341
AIR COOLING SYSTEM
Filed June 16, 1953  3 Sheets-Sheet 2
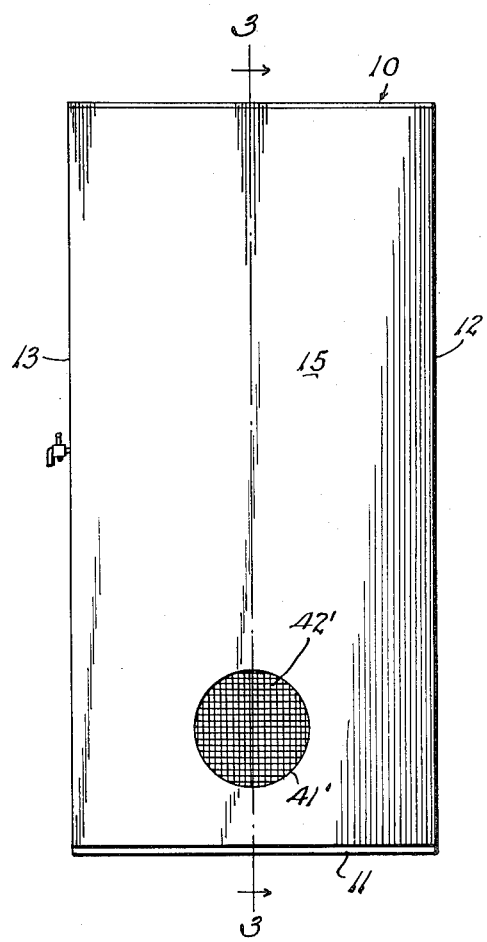
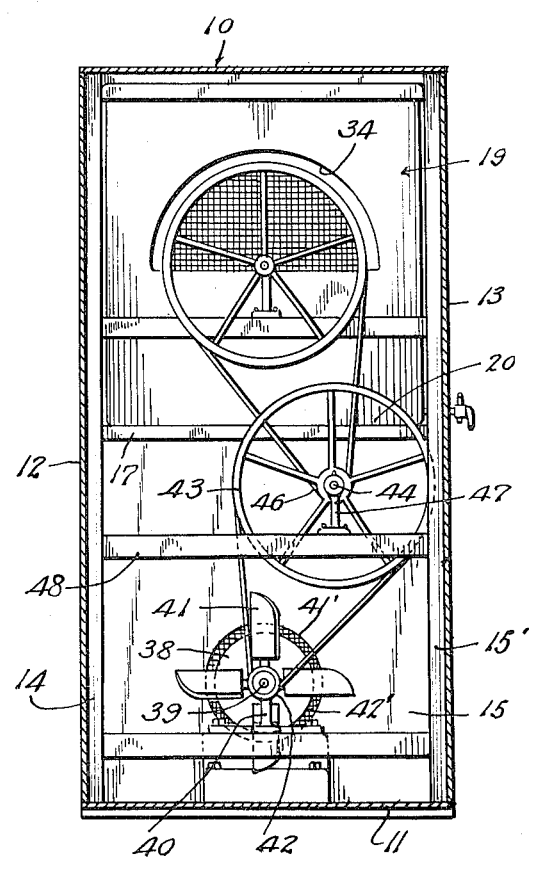
Oliver W. Roe
INVENTOR
BY
ATTORNEYS.

Jan. 10, 1956  O. W. ROE  2,730,341
AIR COOLING SYSTEM
Filed June 16, 1953  3 Sheets-Sheet 3

Oliver W. Roe
INVENTOR

BY *CA Snow & Co.*
ATTORNEYS.

United States Patent Office 2,730,341
Patented Jan. 10, 1956

2,730,341
AIR COOLING SYSTEM
Oliver W. Roe, San Diego, Calif.
Application June 16, 1953, Serial No. 361,949
2 Claims. (Cl. 261—30)

This invention relates to an air cooling system and more particularly to an air cooling system to provide for the circulation of clear cool air.

It is an object of this invention to provide an air conditioning system having a rotatable screen through which the air is directed and a water tank for the screen having water engaging the screen whereby the screen may be cleaned and moistened during the passage of the screen through the water.

It is another object of this invention to provide a housing enclosing a rotatable air screen in one section and a motor and fan below the screen for rotating the screen, the air being initially picked up by the fan and directed through the screen and outwardly of the housing.

A still further object of this invention is to provide a housing having vertically spaced apart horizontal chambers and a vertical chamber communicating with both of the horizontal chambers, the housing having openings in the walls for the admission and the exhaust of air, the motor will be located in the lower of the horizontal chambers and the air cooling and cleaning screen drum in the other of the horizontal chambers with the driving connections between the drum and motor located in the vertically extending chamber, so that the vertically extending chamber will act as an inter-connecting chamber for the passage of air between the horizontal chambers and as a separate enclosure for the operating connection between the drum and the motor.

It is still a further object of this invention to provide an air cooling system which may be constructed at a reasonable cost and which may be maintained in a desired operating condition with an expenditure of very little effort.

Other and further objects and advantages of this invention will be hereinafter described and the novel features thereof defined in the appended claims.

In the drawings:

Fig. 1 is a side elevation of the air cooling system constructed according to an embodiment of my invention.

Fig. 2 is an end elevation of the air cooling system shown in Fig. 1.

Fig. 3 is a longitudinal section taken on the line 3—3 of Fig. 2.

Fig. 4 is a transverse section taken on the line 4—4 of Fig. 3.

Figure 5:
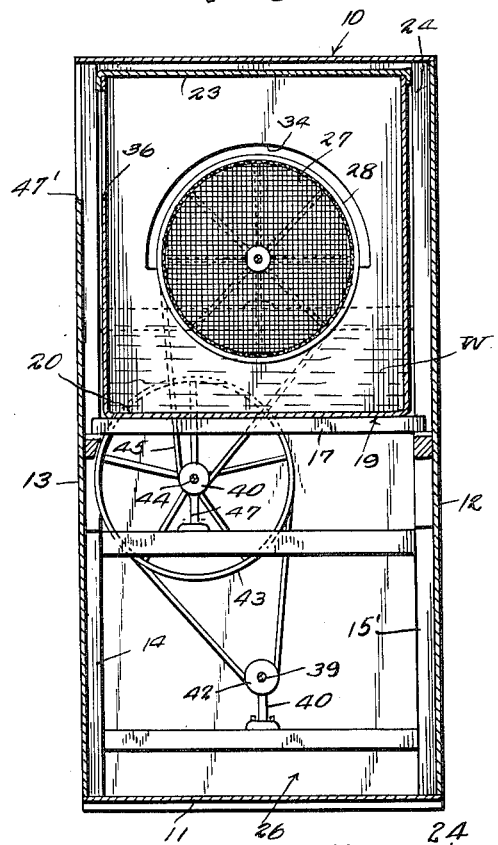
Fig. 5 is a transverse section taken on the line 5—5 of Fig. 3.
Figure 6:
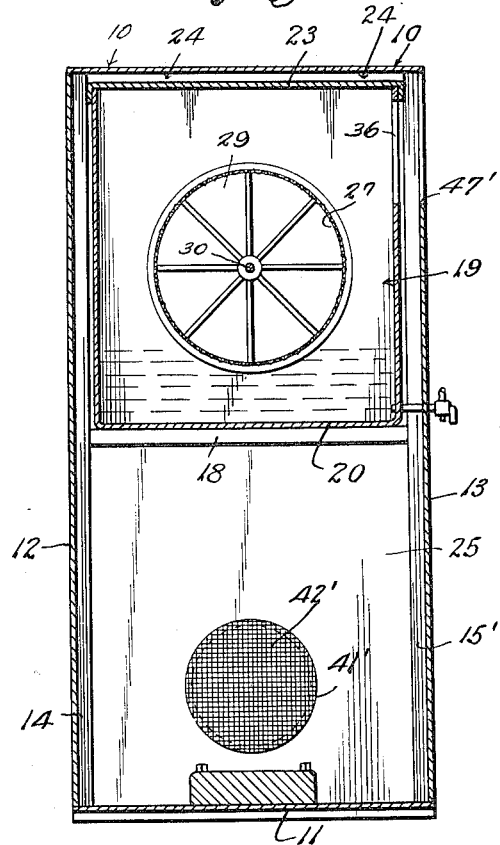
Fig. 6 is a transverse section taken on the line 6—6 of Fig. 3 looking in the direction the same as Fig. 4 and opposite from the direction of Fig. 5.
Figure 7:
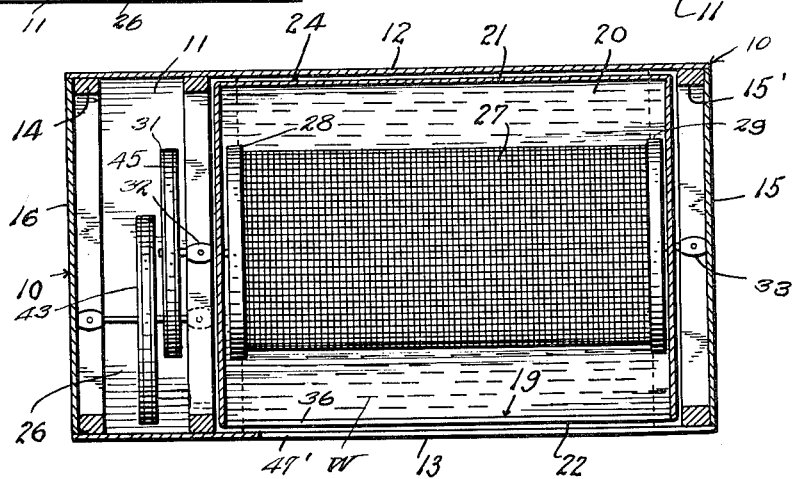
Fig. 7 is a transverse section taken on the line 7—7 of Fig. 3.

Referring to the drawings the numeral 10 designates generally a housing for enclosing the air cooling system of this invention. The housing 10 is adapted to enclose therein the actuating means including the power operator for the entire system. The housing is formed with a bottom wall or base 11 on which is mounted horizontally spaced apart front and rear walls 12 and 13 connected together by vertically extending side walls 15 and 16, the side walls 15 and 16 being longitudinally spaced apart and fixedly secured, at their lowermost edges to the bottom wall 11. The vertically extending edges of the side walls 15 and 16 are fixedly secured by welding, or other suitable rigid fastening means, to the respective front and rear walls 12 and 13.

Within the housing 10 a pair of horizontally spaced apart, vertically extending braces, or brace members 14 and 15' secured to the front and rear wall 12 and 13, and at their lower edge are rigidly secured to the bottom wall 11. The braces 14 and 15' may be of metal, wood or other suitable supporting material. A horizontally extending brace 17 is secured between the vertically extending braces 14 and 15' for purposes to be described hereinafter. Another horizontally extending brace 18 is fixed to and carried by one of the side walls, as the side wall 15, in horizontal alignment with the first mentioned transverse brace 17. A container 19 is supported on the transverse supporing members 17 and 18, the container 19 having a bottom wall 20, side walls 21 and 22 connected to, or formed integral with the bottom wall 20, and extending upwardly therefrom whereby the container 19 will divide the housing 10 into three chambers. One of the chambers, as the chamber 24 is disposed adjacent one side of the housing 10 and spaced from one of the end walls as the end wall 16 and another chamber 25 below the horizontal chamber 24 and below the bottom wall 20 of the container 19. By this disposition of the container 19 adjacent one end of the housing 10, a pair of horizontal chambers 24 and 25 are provided at one end of the housing 10 and a vertically extending chamber 26 is formed adjacent to both of the horizontally extending chambers 24 and 25. The top wall 23 of the container 19 may be removably secured to the side and end walls thereof to provide for removal of the top wall 23 for the admission of water into the container 19.

A cylindrical screen 27 is rotatably mounted within the upper chamber 24. The screen 27 is dipped at its lower side into a body of water W for cleaning and moistening the air which is passed through the hollow container formed by the cylindrical screen 27. The cylinder 27 is closed at its opposite ends by circular walls 28 and 29 and a shaft 30 extends through the cylinder 27, co-axially therewith and is extended at its opposite ends through the end walls 28 and 29 for rotatably supporting the screen 27. A pulley 31 is fixed on one end of the shaft 30 within the housing 10 and also within the vertically extending chamber 26. Suitable supports 32 and 33 are mounted within the housing 10 adjacent the opposite ends of the shaft 30 for rotatably supporting the cylinder 27 and the shaft 30 together with the pulley 31. One end of the container 19 is provided with a semi-cylindrical cutout 34 for the passage of air into the cylinder 27. One side wall as the side wall 35 of the container 19 is provided with a cutout 36 for the exhaust of air through a similar cutout in the rear wall 13 of the housing 10.

A motor 38 is mounted within the lowermost of the horizontally extending chambers, as the chamber 25 and the motor 38 is provided with a longitudinally extending shaft 39. A support 40 is mounted adjacent the other side wall 16 for rotatably supporting the shaft 39 in alignment with the motor shaft of the motor 38. A fan 41 is fixed on the shaft 39 adjacent to the motor 38 to be rotated thereby and for drawing air into the housing 10 through an opening 41' in one of the side walls, as the side wall 15 of the housing. A screen 42' is secured in overlying relation to the opening 41'.

The motor 38 will rotate the fan blade 41 and the cylindrical screen 27 when the motor is connected for operation. The fan 41, being directly connected to the motor shaft 39 will rotate directly with the motor 38 and a connecting means is provided between the shaft 39 and the screen drum 27.

The drive connection between the motor 38 and the screen 27 is accomplished in the vertically extending chamber 26. A lower pulley 42 is fixed on the shaft 39 intermediate the length thereof and adjacent the outer end and an intermediate pulley 43 is rotatably mounted on a secondary shaft 44 between the motor 38 and the screen 27. A belt is trained about the pulleys 42 and 43 for rotating the intermediate shaft 44 together with the drive shaft 39 and a second belt 45 is trained about a second pulley 46 also mounted on the intermediate shaft 44 for rotating the drum 27 together with the shaft 39. Intermediate shaft supporting members 47 are carried by suitable braces 48 in the housing 10.

In the use and operation of the air conditioning system described above, the motor 38 is caused to rotate by suitable electric means, not shown in the drawings, and the rotation of the drive shaft 39 will effect the rotation of the fan 41 for drawing air into the housing 10 through the screen 42 and into the lowermost chamber 25. The air is then directed into the vertically extending chamber 26 and into the horizontally extending chamber 24 through one open end of the cylindrical screen 27 from which the air is exhausted from the housing 10 through the upper opening 47 in the rear wall 13 of the housing.

While the specific details have been herein shown and described, the invention is not confined thereto as changes and alterations may be made without departing from the spirit thereof as defined in the appended claims.

Having described my invention above, what is meant to be protected by Letters Patent is:

1. An air cooling system of the class described comprising a housing having a bottom wall, a pair of vertically spaced apart front and rear walls secured at their lower edges to the bottom wall and rising therefrom, a pair of upstanding spaced apart side walls secured at their lower edges to said bottom wall and at their side edges to the respective front and rear walls, said front and rear walls having exhaust openings adjacent the upper ends thereof, a removable top wall secured to the upper edges of said front, rear and side walls, a transverse horizontally extending brace bar fixed at one end on one of said side walls intermediate the length thereof, vertically extending transversely spaced apart braces fixed on said front and rear walls adjacent to and spaced from the side walls, another transverse brace fixed between said vertically extending braces in horizontal alignment with said first mentioned transverse brace bar, and impervious container adapted to contain liquid having bottom, side and end walls engageable on said transverse braces and spaced from said other side wall thereby defining in said housing upper and lower longitudinal chambers and a vertically extending chamber adjacent one side wall communicating with said upper and lower chambers, a screen cylinder in said container partly dipping into the liquid in said container, a motor in the lower of said longitudinal chambers, drive means operatively connected between the motor and said cylinder for rotating said cylinder in said container, the other one of said side walls having an opening therethrough adjacent the lower end thereof for the entrance of air into said housing, said rear wall having a segmental arcuate opening therein adjacent said top wall in horizontal alignment with the upper peripheral surface of said cylinder for the intake of air into said screen, and a fan connected to said motor in the lower chamber whereby air may be circulated from said lower chamber through said vertical chamber and through said upper chamber.

2. An air cooling system as defined in claim 1 wherein one end wall of said container is formed with an opening in communication with said vertically extending chamber.

References Cited in the file of this patent

UNITED STATES PATENTS

| | | |
|---|---|---|
| 2,087,436 | Kirby | July 20, 1937 |
| 2,232,586 | Alguire | Feb. 18, 1941 |
| 2,300,580 | Loprich | Nov. 3, 1942 |